April 5, 1938.  W. E. KUENTZEL  2,113,028
CATALYST REGENERATION
Filed Oct. 10, 1934
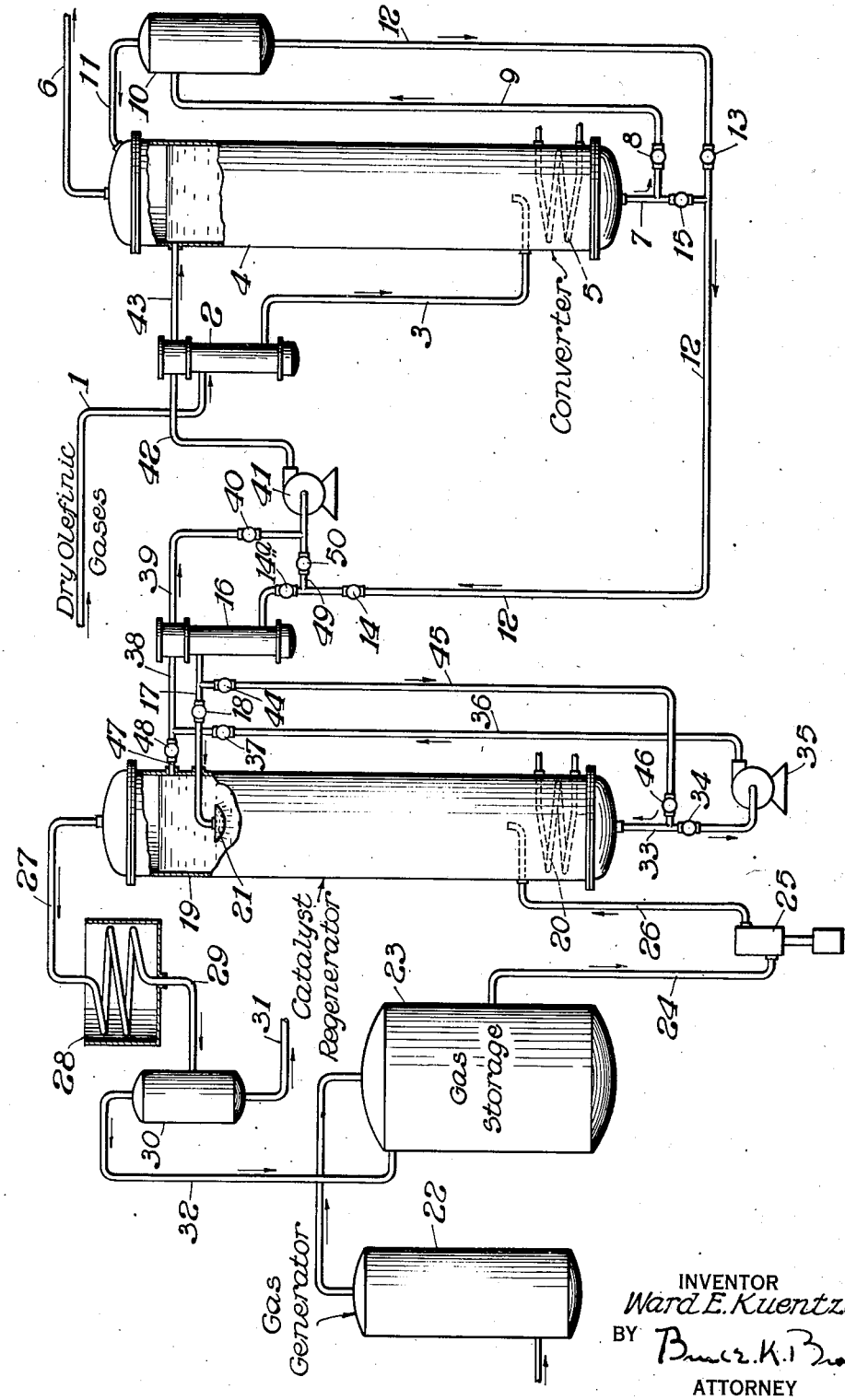
INVENTOR
Ward E. Kuentzel
BY Bruce K. Brown
ATTORNEY Patented Apr. 5, 1938

2,113,028

UNITED STATES PATENT OFFICE 2,113,028

CATALYST REGENERATION

Ward E. Kuentzel, Whiting, Ind., assignor to Standard Oil Company, Chicago, Ill., a corporation of Indiana Application October 10, 1934, Serial No. 747,765

16 Claims. (Cl. 23—238)

This invention relates to a method of regenerating catalysts, and particularly double halides used as catalysts in the cracking of hydrocarbon oils and/or the desulfurization of hydrocarbon oils, and/or the polymerization of hydrocarbons, in particular gaseous olefinic hydrocarbons.

Gaseous olefins from cracking still gases, and/or other sources, and particularly propylene and higher molecular weight olefins, are polymerized into liquid hydrocarbons by treatment under elevated temperatures and at atmospheric pressure or above in the presence of certain double halides. In particular sodium chloroaluminate ($NaAlCl_4$), lithium chloroaluminate ($LiAlCl_4$), antimony bromoaluminate ($SbAlBr_6$), mercury bromoaluminate ($HgAl_2Br_8$) and/or other double halides have been found to be effective catalysts for the purpose of polymerizing gaseous olefins. After continued use the efficiency of the catalysts decreases, and they must either be replaced by fresh catalysts or by catalysts which have been regenerated or reactivated.

My invention contemplates the regeneration of spent double halide catalysts by contacting the same with a halogen, in particular chlorine and bromine containing gas, such as gaseous hydrochloric acid, hydrogen bromide, chlorine gas, bromine gas, and organic halides which liberate halogens and mixtures of these under the operating conditions. As examples of organic halides I may mention carbon tetrachloride, ethylene dichloride, and ethyl bromide.

It is the object of my invention to provide a method of regenerating spent catalysts of the double halide type.

A further object of my invention is to provide a continuous process of regenerating double halide catalysts so that the catalytic reaction may proceed without interruption.

My invention can be better understood by referring to the accompanying drawing which is a schematic diagram of a preferred method for carrying out the same. The method of regenerating the spent catalysts hereinafter described and the apparatus schematically shown for carrying out the same are preferred embodiments of my invention and are not a limitation thereof. As illustrative of my invention and not limiting the scope thereof the regeneration of sodium chloroaluminate will be used as a preferred example.

Referring to the accompanying drawing, gaseous olefins from cracking still gas and/or other sources, after passing through a suitable drier (not shown) enter line 1 and pass through heat exchanger 2 in indirect heat exchange with molten regenerated catalysts as hereinafter explained. The heated olefin gases leave heat exchanger 2 through line 3 and enter converter 4 at a point in the lower portion thereof, and bubble up through a body of molten sodium chloroaluminate maintained at a temperature of about 300 to 600° F. by means of heating coil 5, or other suitable means, and under pressures of about 25–3000 pounds gage. I maintain a body of molten catalyst in converter 4 by means of a balancing drum 10 as hereinafter described. Under these conditions the gaseous olefins, and particularly propylene and the higher homologues are polymerized into liquid hydrocarbons of gasoline characteristics and higher boiling polymers.

Instead of bubbling olefin gases through a body of molten catalyst, I may with equal effectiveness pass the dry olefin gases countercurrent to a spray of molten catalyst in converter 4. When I employ the latter method of contact I by-pass balancing chamber 10 as hereinafter described.

The vaporized lower boiling polymers such as gasoline, and unreacted gases are removed from the converter 4 through line 6 and condensed and separated.

The spent catalysts together with higher boiling polymers are removed under pressure from the converter 4 through line 7 and pass through valve 8 and line 9 into the balancing drum 10 by means of which a level of molten catalyst is maintained in converter 4. A pressure equalizing line 11 provides communication between balancing drum 10 and converter 4 so that the pressure within the two drums is always equal. The spent molten catalyst and heavy polymers leave the balancing chamber 10 through line 12 and valve 13 and pass through expansion valve 14 whereby the pressure is reduced to about atmospheric pressure.

If I effect the polymerization of the olefin gases by passing the same countercurrently to a spray of molten catalyst I close valves 8 ad 13 and by-pass the spent catalyst and high boiling polymers through valve 15 into line 12.

The spent catalyst and high boiling polymers, after passing through the expansion valve 14 and valve 14a, pass through heat exchanger 16 in indirect heat exchange with regenerated catalyst and through line 17 and valve 18 into catalyst regenerator 19 maintained at a temperature of about 700–800° F. by means of heating coil 20 and/or other means. The molten catalyst and higher boiling polymers are distributed in the regenerator through spray means 21 and contacted with gaseous hydrochloric acid as hereinafter described.

Gaseous hydrochloric acid is generated by well known means in generator 22 and the gas so produced stored in gaseous hydrochloric acid storage tank 23. From storage tank 23 the gas is pumped through line 24, pump 25 and line 26 into regenerator 19 and countercurrently contacted with the descending catalyst and high boiling polymers.

The spent catalyst is reactivated by the gaseous hydrochloric acid, and at the temperature maintained by the heating coil 20 in the regenerator, namely about 750° F., the heavy polymers are vaporized. The latter are removed overhead together with HCl vapors through line 27 and condensed in condenser 28 from whence the condensed polymers and HCl vapors are passed through line 29 into separator 30. The condensed polymers are separated from the gaseous hydrochloric acid in separator 30 and removed from the system through line 31, and the separated hydrochloric acid gas removed overhead through line 32 and passed into storage tank 23.

The regenerated catalyst in the molten state is removed from the regenerator 19 through line 33, valve 34 and pump 35 from whence it is pumped through line 36 and valve 37 through line 38 into heat exchanger 16 wherein it imparts a portion of its heat to the spent catalyst being introduced into the regenerator. From heat exchanger 16 the regenerated catalyst passes through line 39 and valve 40 to pump 41 wherein the pressure is boosted to the pressure within converter 4 and the regenerated catalyst passed through line 42 into heat exchanger 2 wherein it is further cooled by the fresh feed gases entering through line 1. The regenerated catalyst now cooled substantially to the temperature within the converter passes through line 43 into converter 4.

I may with equal effectiveness regenerate the spent catalyst by bubbling the gaseous hydrochloric acid through a body of the spent catalyst. This may be accomplished by routing the spent catalyst in the following manner. Valves 18 and 34 are closed. From heat exchanger 16 the spent catalyst is passed through line 17, valve 44, line 45 and valve 46 into line 33 which conveys the molten catalysts into the bottom of regenerator 19 wherein a body of the spent catalyst is maintained. Gaseous hydrochloric acid from storage tank 23 is then bubbled through the body of molten spent catalyst maintained at a temperature of about 750–900° F. whereby the catalyst is reactivated. The sodium aluminum chloride has a boiling point of above 800° C. so that at the regeneration temperature there is no volatilization of the catalyst, and no provision need be made for the condensation of catalyst vapors as is necessary in the regeneration of aluminum chloride used in the treatment of hydrocarbon oils. The regenerated catalyst is removed from the regenerator through line 47, valve 48 and line 38 and passed to the converter 4 in the manner as hereinbefore described, while vaporized polymers and gaseous hydrochloric acid are removed overhead through line 27 as hereinbefore described.

Under certain circumstances the catalyst in converter 4 does not lose its effectiveness until after repeated use, in which case it is not necessary to regenerate it after each cycle. When I desire to recycle the catalyst without regenerating the same I can do so by closing valves 14a and 40 and by-passing the catalyst through line 49 and valve 50 into pump 41 from whence it is pumped under pressure through line 42, exchanger 2 and line 43 back to converter 4. I may also, by only partially closing valve 14a and 40 pass a portion of the catalyst through the regenerating system.

In some cases it may be desirable to employ a suitable filling or supporting material, such as pumice, coke, tile, etc. in converter 4, and to spray the molten catalyst on to the filling or supporting material and recycling the catalyst from the lower part of the converter 4, much in the same manner as previously shown. I may also, if desired, regenerate the catalyst at intervals in converter 4 without removing it therefrom. This may be accomplished by interrupting the stream of olefinic gases passing to the converter 4 and treating the supported catalyst in situ with hydrochloric acid gas.

Conducting the polymerization of olefin gas and regenerating the spent catalyst in the manner above described, the following data were obtained, demonstrating the effectiveness of my invention. Propylene was bubbled through a bed of molten sodium chloroaluminate at a temperature of 500–600° F. for various lengths of time and the percent conversion obtained. When the percent conversion showed a marked decrease, the catalyst was regenerated by bubbling HCl gas through the body of molten catalysts at 750° F. After regeneration the percent conversion was substantially the same as the per cent conversion using fresh catalyst.

EFFECTIVENESS OF REGENERATED DOUBLE HALIDE CATALYSTS (*Sodium chloroaluminate*)

| Run | Temp. | Duration of use (time in minutes) | Conversion wt. % | Notes |
|---|---|---|---|---|
| 1 | °F. 550 | 60 | 12.9 | |
| 2 | 600 | 40 | 3.9 | |
| 3 | 550 | 50 | 1.1 | |
| 4 | 560 | 90 | 17.4 | (Catalyst regenerated with HCl gas at 750° F. for 1 hr.) |

It will be observed that the effectiveness of the catalyst was reduced from 12.9% conversion using fresh catalyst to 1.1% after about 150 minutes contact with propylene. Upon regenerating the spent catalyst by treating the same with HCl gas at 750° F. for one hour the effectiveness of the catalyst was increased to the same activity as the fresh catalyst. Although I am unable definitely to state what reaction or reactions take place in the regeneration of the metallo haloaluminate catalysts which cause them to regain their effectiveness it is my belief that at the regeneration temperature, namely 700–900° F., the occluded higher boiling polymers and carbonaceous material are distilled off and the halogens and/or halogen acids, I believe, act to fortify the metallohaloaluminate catalyst. This is indicated by the fact that while nitrogen, when substituted for hydrogen chloride, has some beneficial action it is not nearly as effective as the halogen acid. When air is used instead of gaseous hydrochloric acid the catalyst is converted to an infusible mass.

It is well known that aluminum chloride forms double compounds with hydrocarbons that exhibit surprising stabilities in some cases. It is believed that the decline in catalytic activity exhibited by sodium chloroaluminate may be due to the formation of such double compounds, which are destroyed by the hydrochloric acid gas treatment hereinbefore described. It is believed that the organic portion of the double compound may be converted to a volatile halogen derivative by the action of the gas, the volatile material being eliminated. Or perhaps the organic polymer is driven off from the catalyst by the gas which is in turn preferentially absorbed by the catalyst. I am led to believe that the latter explanation is perhaps a true one by the following phenomena. I have observed that in some cases the freshly regenerated catalysts are not as active as the regenerated catalysts after a short period of use. I have also observed that during the period in which the catalytic activity is increasing, after regeneration, hydrogen chloride is eliminated from the reaction chamber. This may be due to the formation of a catalyst-hydrogen chloride complex during the regeneration of the spent catalyst. This complex is perhaps gradually destroyed during the subsequent reaction with the gaseous olefins resulting in the increased activity of the catalyst and the liberation of the halogen acid. With continued use the gradual accumulation of high boiling polymers again reduces the catalytic activity of the catalyst, making it necessary to again regenerate the latter.

Although I have described in detail the regeneration of sodium-chloroaluminate used as a catalyst in the polymerization of gaseous olefins I do not wish to limit my invention to this type of reaction. I have found that metallohaloaluminates used as catalysts in the cracking of hydrocarbon oils and other carbonaceous materials, and in the desulfurization of hydrocarbons, can be effectively regenerated in the manner above described.

The scope of my invention is therefore not to be limited by the foregoing description except as defined by the following claims.

I claim:

1. In the process of polymerizing olefin gases wherein said gases are treated under pressure and at elevated temperatures in the presence of a molten catalyst comprising the double salt of sodium and aluminum chlorides, the steps of regenerating the spent catalyst which comprises removing said molten catalyst and high boiling polymers from the reaction chamber, introducing the high boiling polymers and spent catalyst in the molten state into a regenerating chamber, heating same therein to a temperature sufficiently above that in the said reaction chamber to vaporize said polymers, passing gaseous HCl into the regenerating chamber wherein the said catalyst in molten condition is brought into contact with the gaseous HCl, removing the regenerated catalyst in molten condition from the regenerating chamber and introducing the same into the said reaction chamber, removing the unreacted gaseous HCl and vaporized high boiling polymers from the regenerating chamber, condensing the vaporized high boiling polymer vapors, separating the said condensed high boiling polymers from the gaseous HCl and returning the said gaseous HCl to a HCl storage chamber.

2. The process of regenerating spent double halide catalysts containing only one kind of halogen atom which have been used to treat hydrocarbon products, which comprises maintaining the halide in a molten condition and contacting it while in molten condition with a reactivating agent selected from the group consisting of halogens, hydrohalogen acids and organic halides, wherein the halogens in both the reactivating agents and halide catalyst are the same, to thereby regenerate the spent catalyst without any substantial vaporization thereof.

3. The process of regenerating spent double halide catalysts containing only one kind of halogen atom and which have been used to treat hydrocarbon products which comprises maintaining the halide in a molten condition and contacting it while in molten condition with a halogen containing gas, wherein the halogens in both the gas and catalyst are the same, to thereby regenerate the spent catalyst without any substantial vaporization thereof.

4. The process of regenerating spent double halide catalysts containing only one kind of halogen atom which have been used to treat hydrocarbon products, which comprises maintaining the halide in a molten condition and contacting it while in molten condition with a gaseous hydrohalogen acid wherein the halogens in both the acid and halide catalyst are the same, to thereby regenerate the spent catalyst without any substantial vaporization thereof.

5. The process of regenerating spent double chloride catalysts which have been used to treat petroleum hydrocarbons, which comprises maintaining the catalyst in a molten condition and contacting it while in molten condition with an organic chloride to thereby regenerate the spent catalyst without any substantial vaporization thereof.

6. The process of regenerating spent double halide catalysts selected from the group consisting of double metallic salts of chlorine and bromine which have been used to treat petroleum hydrocarbons, which comprises maintaining the spent catalyst in molten condition and contacting it while in molten condition with a halogen containing gas selected from the group consisting of chlorine and bromine wherein the halogens in both the catalyst and halogen containing gas are the same, to thereby regenerate the spent catalyst without any substantial vaporization thereof.

7. The process of regenerating spent double halide catalysts selected from the group consisting of double metallic salts of chlorine and bromine which have been used to treat petroleum hydrocarbons which comprises maintaining the spent catalyst in molten condition and contacting it while in molten condition with a halogen acid selected from the group consisting of hydrogen chloride and hydrogen bromide wherein the halogens in both the catalyst and hydrogen halide are the same, to thereby regenerate the spent catalyst without any substantial vaporization thereof.

8. The process of regenerating spent double halide catalysts selected from the group consisting of double metallic salts of chlorine and bromine which have been used to treat petroleum hydrocarbons which comprises maintaining the spent catalyst in molten condition and contacting it while in molten condition with an organic halide selected from the group consisting of chlorine and bromine wherein the halogens in both the catalyst and organic halide are the same to thereby regenerate the spent catalyst without any substantial vaporization thereof.

9. The process of regenerating spent polymerization catalysts comprising sodiumchloroaluminate which has been used to polymerize olefin containing gases, which comprises maintaining the spent catalyst in molten condition and contacting it while in molten condition with HCl gas to thereby regenerate the spent catalyst without any substantial vaporization thereof.

10. The process of regenerating spent polymerization catalysts comprising sodiumchloroaluminate which has been used to polymerize olefin containing gases, which comprises maintaining the spent catalyst in molten condition and contacting it while in molten condition with an organic chloride capable of liberating HCl gas at the temperature of the molten spent catalyst to thereby regenerate the spent catalyst without any substantial vaporization thereof.

11. The process of regenerating spent polymerization catalysts comprising sodiumchloroaluminate which has been used to polymerize olefin containing gases, which comprises maintaining the spent catalyst in molten condition and contacting it while in molten condition with chlorine gas to thereby regenerate the spent catalyst without any substantial vaporization thereof.

12. The process of reactivating spent sodiumchloroaluminate which has been used as a catalyst in the polymerization of gaseous olefins, which comprises maintaining the spent catalyst in molten condition and contacting it while in molten condition with HCl gas to thereby regenerate the spent catalyst without any substantial vaporization thereof.

13. The process of regenerating spent polymerization catalysts comprising sodiumchloroaluminate which has been used to polymerize olefin containing gases, which comprises maintaining the spent catalyst in molten condition and at a temperature above 600° F. with HCl gas to thereby regenerate the spent catalyst without any substantial vaporization thereof.

14. The process of regenerating spent polymerization catalysts comprising alkalichloroaluminate which has been used to polymerize olefin containing gases, which comprises maintaining the spent catalyst in molten condition and contacting it while in molten condition with an organic chloride capable of liberating HCl gas at the temperature of the molten spent catalyst to thereby regenerate the spent catalyst without any substantial vaporization thereof.

15. In a process wherein olefin gases are polymerized under pressure and at elevated temperatures in the presence of a double halide catalyst selected from the group consisting of double metallic salts of chlorine and bromine, and wherein polymers are formed which are retained with the catalyst, the steps of regenerating the spent catalyst which comprise maintaining the spent catalyst at a temperature sufficient to vaporize the polymers and keep the catalyst in molten condition and contacting the catalyst while in molten condition with a halogen containing gas selected from the group consisting of chlorine and bromine wherein the halogen in both the catalyst and halogen containing gases are the same, to thereby regenerate the catalyst without any substantial vaporization thereof.

16. In a process wherein olefin gases are polymerized under pressure and at elevated temperatures in the presence of a catalyst comprising the double salt of sodium and aluminum chlorides, and wherein polymers are formed which are retained with the catalyst, the steps of regenerating the spent catalyst which comprise maintaining the spent catalyst at a temperature sufficient to vaporize the polymers and keep the catalyst in molten condition and contacting the catalyst while in molten condition with HCl gas to thereby regenerate the catalyst without any substantial vaporization thereof.

WARD E. KUENTZEL.